(12) United States Patent
Foster

(10) Patent No.: US 11,567,497 B1
(45) Date of Patent: Jan. 31, 2023

(54) SYSTEMS AND METHODS FOR PERCEIVING A FIELD AROUND A DEVICE

(71) Applicant: Direct Current Capital LLC, Wilmington, DE (US)

(72) Inventor: Paul Foster, Mountain View, CA (US)

( * ) Notice: Subject to any disclaimer, the term of this patent is extended or adjusted under 35 U.S.C. 154(b) by 323 days.

(21) Appl. No.: 16/781,165

(22) Filed: Feb. 4, 2020

Related U.S. Application Data

(60) Provisional application No. 62/801,069, filed on Feb. 4, 2019.

(51) Int. Cl.
| | |
|---|---|
| G05D 1/00 | (2006.01) |
| G05D 1/02 | (2020.01) |
| G06T 7/20 | (2017.01) |
| G06T 7/521 | (2017.01) |
| G06T 7/60 | (2017.01) |
| G01C 21/32 | (2006.01) |
| G06V 20/56 | (2022.01) |
| G01S 17/06 | (2006.01) |
| B60W 60/00 | (2020.01) |

(52) U.S. Cl.
CPC ........... *G05D 1/0212* (2013.01); *G01C 21/32* (2013.01); *G06T 7/20* (2013.01); *G06T 7/521* (2017.01); *G06T 7/60* (2013.01); *G06V 20/56* (2022.01); *B60W 60/001* (2020.02); *B60W 2554/40* (2020.02); *G01S 17/06* (2013.01); *G06T 2207/10028* (2013.01); *G06T 2207/30241* (2013.01); *G06T 2207/30252* (2013.01)

(58) Field of Classification Search
CPC ......... G05D 1/0212; G06T 7/521; G06T 7/20; G06T 7/60; G06T 2207/10028; G06T 2207/30241; G06T 2207/30252; G06V 20/56; G01C 21/32; B60W 2554/40; B60W 60/001; G01S 17/06
USPC ........................................................ 701/25
See application file for complete search history.

(56) References Cited

U.S. PATENT DOCUMENTS 7,840,355 B2    11/2010  Breed et al.
8,194,998 B2     6/2012  Saito
(Continued)

OTHER PUBLICATIONS

Ohn-Bar et al., U.S. Appl. No. 15/271,702, filed Sep. 21, 2016.
(Continued)

*Primary Examiner* — Tyler J Lee
*Assistant Examiner* — Tiffany P Ohman
(74) *Attorney, Agent, or Firm* — Polsinelli PC

(57) ABSTRACT

Systems and methods for perceiving a field around a mobile device include a sensor system has a distance sensor arranged on a mobile device. The sensor system captures distance measurements of a field of view. The distance measurements are captured at a unique set of angular scan positions per revolution of the distance sensor over a sequence of scan rotations. A perception system generates a three-dimensional point cloud representation of the field of view based on the distance measurements for each scan rotation in the sequence of scan rotations. The perception system generates a composite three-dimensional depth map of the field of view by compiling each of the three-dimensional point cloud representations for the sequence of scan rotations. Each of the three-dimensional point cloud representations has a resolution that is lower than a resolution of the composite three-dimensional depth map of the field of view.

20 Claims, 7 Drawing Sheets

(56) References Cited

U.S. PATENT DOCUMENTS

| | | |
|---|---|---|
| 8,311,343 B2 | 11/2012 | Chung |
| 8,488,877 B1 | 7/2013 | Owechko et al. |
| 8,731,816 B2 | 5/2014 | Dintzer et al. |
| 8,907,771 B2 | 12/2014 | Vasquez et al. |
| 10,854,011 B2 | 12/2020 | Tay et al. |
| 2008/0319670 A1 | 12/2008 | Yopp et al. |
| 2010/0209013 A1 | 8/2010 | Minear et al. |
| 2011/0098890 A1 | 4/2011 | Lundmark et al. |
| 2011/0286628 A1 | 11/2011 | Goncalves et al. |
| 2012/0027255 A1 | 2/2012 | Endo |
| 2012/0158250 A1 | 6/2012 | Stiegler |
| 2014/0032093 A1 | 1/2014 | Mills |
| 2014/0035777 A1 | 2/2014 | Kim et al. |
| 2014/0343750 A1 | 11/2014 | Minemura et al. |
| 2015/0009010 A1 | 1/2015 | Biemer |
| 2015/0294192 A1 | 10/2015 | Lan et al. |
| 2018/0158200 A1* | 6/2018 | Metzler .................. G01C 15/00 |
| 2019/0026956 A1 | 1/2019 | Gausebeck et al. |
| 2019/0108396 A1 | 4/2019 | Dal Mutto et al. |
| 2019/0120947 A1 | 4/2019 | Wheeler et al. |
| 2019/0287254 A1 | 9/2019 | Lakshmi Narayanan et al. |
| 2019/0291723 A1 | 9/2019 | Srivatsa et al. |
| 2019/0311546 A1 | 10/2019 | Tay et al. |
| 2019/0362178 A1 | 11/2019 | Huang et al. |
| 2020/0043186 A1* | 2/2020 | Selviah .............. G06V 10/7515 |
| 2020/0349742 A1 | 11/2020 | Wang et al. |
| 2022/0113159 A1* | 4/2022 | Hou ................... G01C 21/3837 |

OTHER PUBLICATIONS

Ohn-Bar et al., U.S. Appl. No. 15/271,704, filed Sep. 21, 2016.
Song et al., U.S. Appl. No. 16/587,942, filed Sep. 30, 2019.
Lim et al., U.S. Appl. No. 16/834,974, filed Mar. 30, 2020.

\* cited by examiner

SYSTEMS AND METHODS FOR PERCEIVING A FIELD AROUND A DEVICE

FIELD

Aspects of the present disclosure relate to systems and methods for perceiving a field of view around a mobile device and more particularly to autonomously navigating an autonomous machine through a field based on composite three-dimensional depth map.

BACKGROUND

Mobile devices, such as autonomous vehicles, autonomous machines, personal computing devices, and/or the like, often capture images of a field of view around the mobile device to interact with, navigate around, or otherwise understand objects within the field of view. However, conventional systems often emphasize either computational speed or accuracy at the other's expense. As such, it is challenging for the mobile device to identify objects and their respective movements within the field of view, particularly with sufficient speed to autonomously determine actions, such as navigational actions, in view of the objects within the field of view. It is with these observations in mind, among others, that various aspects of the present disclosure were conceived and developed.

SUMMARY

Implementations described and claimed herein address the foregoing problems by providing systems and methods for perceiving a field around a mobile device. In one implementation, a first set of distance values of a field around a mobile device is obtained. The first set of distance values is captured by rotating a distance sensor during a first scan rotation. A second set of distance values of the field around the mobile device is obtained. The second set of distance values is captured by rotating the distance sensor during a second scan rotation subsequent to the first scan rotation. A predicted change in position between a first position of the mobile device and a second position of the mobile device is generated. The first position corresponds to the first scan rotation, and the second position corresponds to the second scan rotation. A set of adjusted distance values is generated by shifting the first set of distance values based on the predicted change in position. A composite three-dimensional depth map of the field around the mobile device is generated by compiling the set of adjusted distance values and the second set of distance values.

In another implementation, a sensor system has a distance sensor arranged on a mobile device. The sensor system captures distance measurements of a field of view. The distance measurements are captured at a unique set of angular scan positions per revolution of the distance sensor over a sequence of scan rotations. A perception system generates a three-dimensional point cloud representation of the field of view based on the distance measurements for each scan rotation in the sequence of scan rotations. The perception system generates a composite three-dimensional depth map of the field of view by compiling each of the three-dimensional point cloud representations for the sequence of scan rotations. Each of the three-dimensional point cloud representations has a resolution that is lower than a resolution of the composite three-dimensional depth map of the field of view.

Other implementations are also described and recited herein. Further, while multiple implementations are disclosed, still other implementations of the presently disclosed technology will become apparent to those skilled in the art from the following detailed description, which shows and describes illustrative implementations of the presently disclosed technology. As will be realized, the presently disclosed technology is capable of modifications in various aspects, all without departing from the spirit and scope of the presently disclosed technology. Accordingly, the drawings and detailed description are to be regarded as illustrative in nature and not limiting.

DETAILED DESCRIPTION

Figure 1:
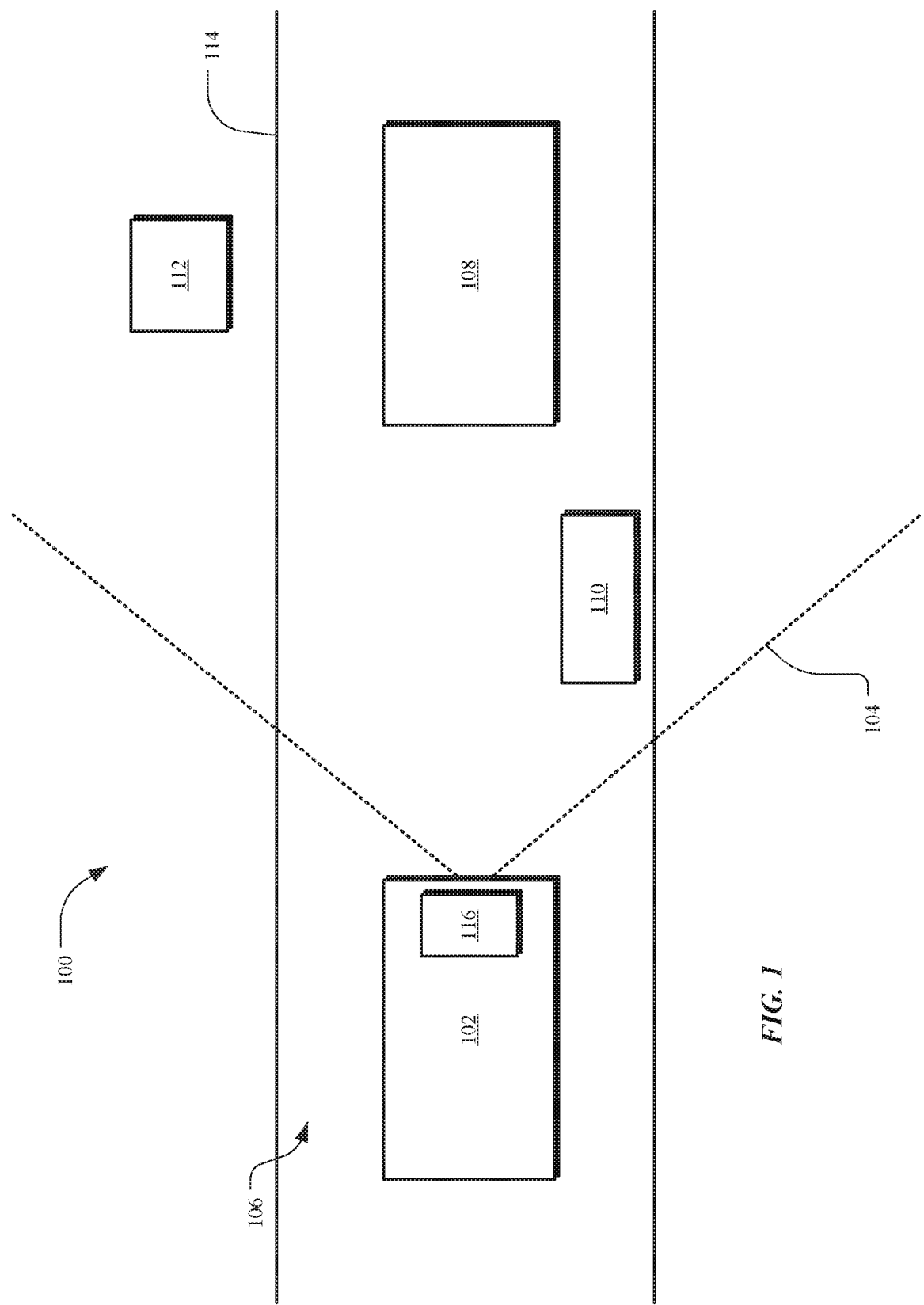
FIG. 1 illustrates an example environment for perceiving a field of view around a mobile device.

Aspects of the presently disclosed technology relate to systems and methods for perceiving a field of view around a mobile device, such as an autonomous machine, an autonomous vehicle, a personal computing device, and/or the like and in some cases, autonomously navigating the mobile device in response. In one aspect, a composite three-dimensional (3D) depth map is generated by the mobile device for perceiving a field of view around the mobile device. To generate the composite 3D depth map, distance measurements are recorded with a rotating distance sensor at different angular scan positions per revolution. In capturing the distance measurements, a column of pixels is rotated about an azimuthal axis at an angular speed, and an angular position of the column is tracked to an angular resolution to record the distance measurements. The distance measurements are recorded up to a number of angular scan positions less than a native angular resolution of the distance sensor. More particularly, during a first scan rotation, distance measurements are recorded from the column of pixels at a number of angular scan positions less than the angular resolution and approximating or otherwise based on an irrational number. During subsequent scan rotations, distance measurements are recorded at fewer angular scan positions that are angularly offset. In some aspects, the distance measurements between scan rotations are shifted based on a predicted change in position of the mobile device between the scan rotations. Using the distance measurements, a sequence of baseline perceptions, such as 3D point cloud representations, low resolution depth maps, and/or the like, are generated. The sequence of baseline perceptions generated over multiple scan rotations is compiled into a composite perception, such as a composite 3D depth map, high resolution depth map, and/or the like. The composite 3D depth map has a higher resolution than the native resolution of the distance sensor and then each of the baseline perceptions. The composite 3D depth map may be used for object identification and tracking, determining object extent (e.g., size, geometry etc.), differentiating and tracking multiple objects simultaneously, autonomously navigating through the field of view around the mobile device, and/or the like.

The various systems and methods disclosed herein generally provide for perceiving objects in a field of view around a mobile device faster, with high accuracy, and less computational burden. Example implementations discussed herein reference perceiving a field of view around an autonomous vehicle, identifying and tracking various objects in the field of view, generating a motion plan for autonomously navigating through the field of view, and/or the like in response. However, it will be appreciated by those skilled in the art that the presently disclosed technology is applicable to other manned and unmanned autonomous machines, including, without limitation, terrestrial vehicles, aerial vehicles, aerospace vehicles, submersible vehicles, and/or the like, as well as other mobile devices, such as smartphones, tablet, personal computers, robotics, mobile computing devices, and/or the like.

For a detailed description of an example environment 100 for perceiving a field of view 104 around an autonomous vehicle 102 as it travels along a travel path 106 of a route, reference is made to FIG. 1. While FIG. 1 illustrates the field of view 104 as being generally in front of the autonomous vehicle 102 as it travels along the travel path 106, it will be appreciated that the field of view 104 may be all or any portion of the 360 degree area around the autonomous vehicle 102. Various objects (e.g., objects 108-114), which may be mobile objects and/or stationary objects, may be located within the field of view 104.

In one implementation, the autonomous vehicle 102 is autonomously navigating along a route and moving on the travel path 106 along the route. The autonomous vehicle 102 is capable of operating to move along the travel path 106 with limited input from occupants within an interior of the autonomous vehicle 102. Stated differently, rather than the user having an operational engagement with the autonomous vehicle 102 to control its actions, the occupant may simply input a destination point or other instruction and the autonomous vehicle 102 transports the occupant through a series of autonomous decisions. As a result, depending on their nature and movement, objects, including mobile, stationary, and/or traffic objects in the scene 104, including without limitation: vehicles (e.g., vehicle 108); pedestrians (e.g., pedestrian 112); personal vehicles, such bicyclists (e.g., cyclist 110), skateboarders, operators of scooters, etc.; ground surfaces (e.g., curb 114, street, sidewalks, etc.); and/or the like, may or may not impact the actions being executed by the autonomous vehicle 102 as it navigates through the scene 104. Thus, the autonomous vehicle 102 generates a selected perception of the scene 104, from which a motion plan may be generated for autonomously navigating through the scene 104.

In one implementation, the autonomous vehicle 102 includes one or more distance sensors 116, which may be mounted on or in or otherwise integrated with the autonomous vehicle 102. While the autonomous vehicle 102 is stationary or moving along the travel path 106, the distance sensor 116 is activated to rotate a column of pixels about an azimuthal axis at an angular speed to capture distance measurements to various surfaces in the field of view 104. The various surfaces in the field of view 104 may correspond to one or more objects. The distance sensor 116 tracks an angular position of the column of pixels to an angular resolution, which may correspond to a native angular resolution of the distance sensor 116. Thus, in one implementation, distance measurements are recorded from the column of pixels at up to a number of angular scan positions that is less than the angular resolution during a sequence of scan rotations.

More particularly, during a first scan rotation of the distance sensor 116, a first set of distance values from the column of pixels is recorded at a first set of angular scan positions less than the angular resolution. During a second scan rotation of the distance sensor 116 subsequent to the first scan rotation, the distance sensor 116 records a second set of distance values from the column of pixels at a second set of angular scan positions that is less than the first number of angular scan positions. The first number and/or the second number of angular scan rotations may approximate or otherwise be based on an irrational number. The second set of angular scan positions may further be angularly offset from the second set of radial scan positions. In one implementation, the first set of distance values is shifted based on a predicted change in position of the autonomous vehicle 102 from the first scan rotation to the second scan rotation to generate a set of adjusted distance values. During the second scan rotation, a composite 3D depth map representing the field of view 104 around the autonomous vehicle 102 is generated by compiling the set of adjusted distance values and the second set of distance values.

Generally, each of the distance sensor(s) 116 is a rotating distance sensor, such as a scanning LIDAR system, that captures distance measurements at a unique set of radial scan positions per revolution of the distance sensor 116 over a sequence of scan rotations of the distance sensor 116. The lower-resolution distance measurements generated over multiple scan rotations of the distance sensor 116 are compiled into a higher-resolution representation of the field 104 around the autonomous vehicle 102. In one implementation, in conjunction with the rotation of the distance sensor 116, the column of pixels in the distance sensor 116 is triggered to record distance values over a different sequence of angular (radial) scan positions from one scan rotation of the distance sensor 116 to the next scan rotation. A baseline perception is generated based on distance data collected by the column of pixels per scan rotation of the distance sensor 116. The baseline perception may be in the form of a lower-resolution 3D depth map, such as a 3D point cloud with each point in the 3D point cloud representing a 3D position of a surface in a field of view of a pixel when the distance sensor 116 is occupying one discrete radial position in one instant in time during the scan revolution. A sequence of 3D depth maps recorded over multiple scan rotations of the distance sensor 116 is compiled into one higher-resolution composite 3D depth map exhibiting greater spatial resolution, involving shorter distances between surfaces in the field 104 represented by adjacent points in the composite 3D depth map, than the native resolution of the distance sensor 116.

In one implementation, the number of angular scan positions per scan rotation is based on an irrational number. Stated differently, a number of angular scan positions per scan rotation may be equal to or approximating an irrational number, such that sequences of angular scan positions executed by the distance sensor are unique over multiple consecutive scan rotations. For example, the distance sensor 116 may sample the column of pixels for distance values at up to 40,000 radial scan positions per second and to track its angular position to an angular resolution of 16,000 points per revolution. In this example, the distance sensor 116 may be activated to rotate at 20 Hz, thus enabling the distance sensor 116 to sample the column of pixels for distance values at up to 2,000 unique angular scan positions per scan rotation. However, in this example, the distance sensor 116 may sample the column of pixels at a number of angular scan positions approximating an irrational number, such as: 1,941.64 scan positions (i.e., 1200($\varphi$) angular scan positions, wherein $\varphi$ is the "Golden Ratio" or "1.61803398875 . . .") per scan rotation; or 1,998.38 angular scan positions (i.e., 2,000–$\varphi$ radial scan positions) per scan rotation. Thus, a lower-resolution 3D depth map containing 2,000 columns of distance values per scan rotation may be generated in this example.

In the foregoing example, operating the distance sensor 116 at a slower angular speed (e.g., 10 Hz) may yield a higher-resolution 3D depth map per scan rotation (e.g., a 3D depth map containing 4,000 columns of distance values per scan rotation). However, this 3D depth map may exhibit a relatively large temporal error between columns of distance values collected at the beginning of the scan rotation and at the end of the scan rotation, which may produce a "jog" unit of distance data around a 0° position defining the beginning and end of a scan rotation. Furthermore, the greater duration of time between consecutive 3D depth maps generated in this manner by the distance sensor 116 may yield greater delays in detection, perception, and response to external objects, such as objects 108-114, present in the field of view 104 near the autonomous vehicle 102.

Accordingly, the distance sensor 116 may be operated at a relatively high speed (e.g., 20 Hz) to produce lower-resolution 3D depth maps at a faster rate and exhibiting less temporal error. In particular, these individual, lower-resolution 3D depth maps may exhibit minimal temporal error, such that a constellation of points contained in one individual, lower-resolution 3D depth map may represent a constellation of surfaces in the field 104 at relative positions at one instant in time (e.g., within a 50-millsecond period). The lower-resolution 3D depth maps may be processed individually, for example to quickly identify relatively large objects and detect gross changes in the field 104 around the autonomous vehicle 102 with relatively high spatial accuracy. By comparing relative positions of these objects across a sequence of consecutive lower-resolution 3D depth maps, relative velocities and relative accelerations of these objects may be derived.

Furthermore, a sequence of consecutive, individual 3D depth maps may be merged into one higher-resolution composite 3D depth map, such as by adjusting (or "correcting") points in older 3D depth maps based on changes in the position of the autonomous vehicle 102 and/or derived velocities of other objects since the 3D depth maps were recorded. In the foregoing example, up to 9 consecutive lower-resolution 3D depth maps may be compiled into one higher-resolution composite 3D depth map, which may be processed to identify types, classes, sizes, geometries, and/or other descriptors of both large objects (e.g., the vehicle 108) and small objects (e.g., the curb 114 or the pedestrian 112) in the field 104 around the autonomous vehicle 102 and to predict trajectories or motion of these objects with relatively high accuracy.

Figure 2:
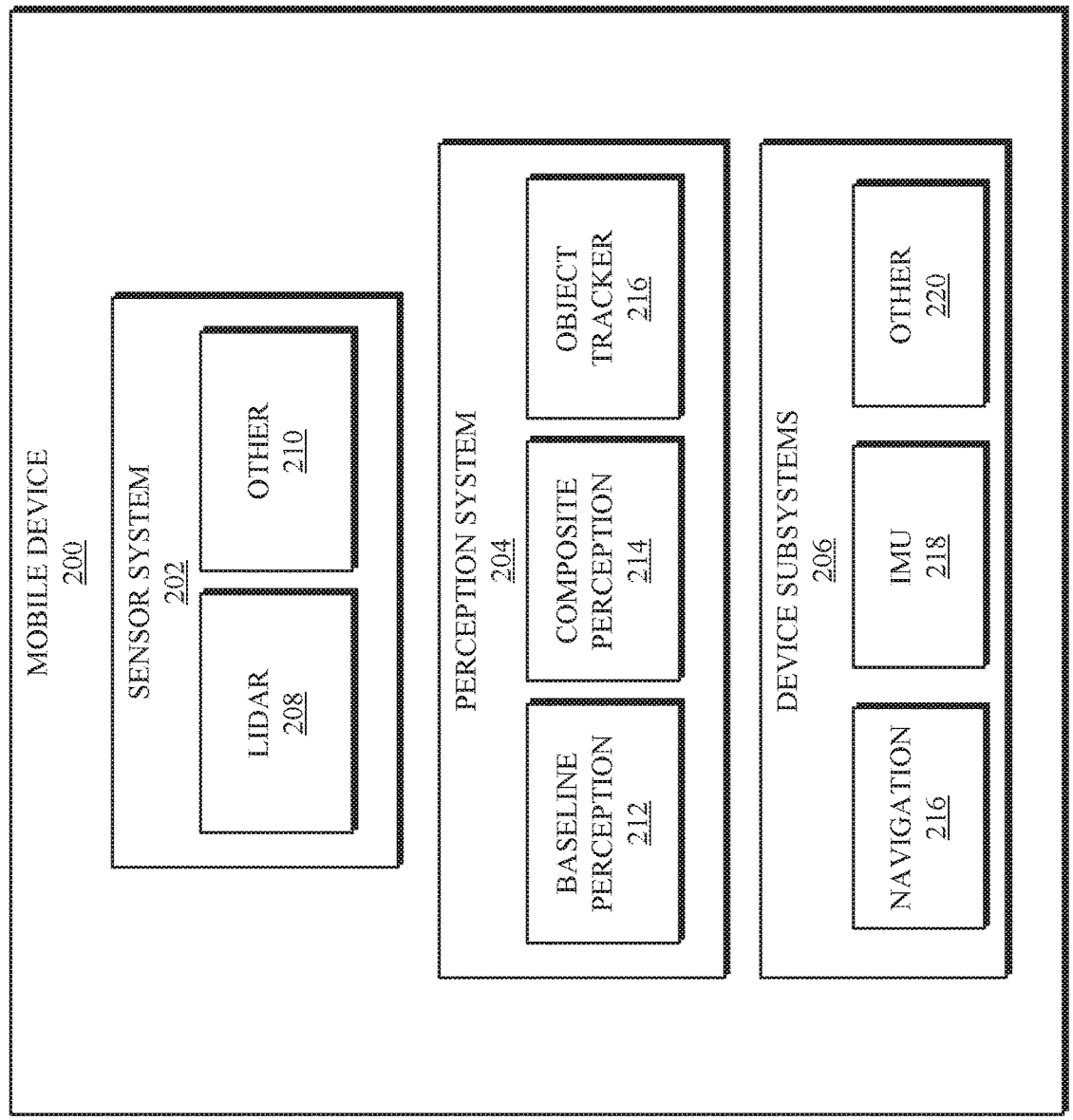
FIG. 2 is a block diagram of an example mobile device.

Turning to FIG. 2, an example mobile device 200, which may be the autonomous vehicle 102 or another, static or moving sensor platform or robotics platform, is shown. In one implementation, the mobile device 200 includes a sensor system 202, a perception system 204, and device subsystems 206. The sensor system 202 includes one or more sensors to capture perception data of the field of view 104, such as distance measurements of surfaces within the field of view 104. The sensor system 202 may include one or more LIDAR sensors 208, and/or one or more other sensors 210 (e.g., a camera, RADAR, etc.). In one implementation, the LIDAR sensors 208 include spinning LIDAR sensors, which may be the one or more distance sensors 116, that rotate during a sequence of scan rotations. The LIDAR sensor 208 captures distance measurements of the field of view 104 at a unique set of angular scan positions per revolution of the LIDAR sensor 208 over the sequence of scan rotations.

Using the distance measurements, the perception system 204 generates a baseline perception 212 of the field of view 104. The baseline perception 212 may be a low resolution depth map, for example in the form of a 3D point cloud representation of the field of view 104 generated based on the distance measurements for each scan rotation in the sequence of scan rotations. The perception system 204 generates a composite perception 214, for example, a composite 3D depth map of the field of view 104, by compiling each of the baseline perceptions 212 for the sequence of scan rotations. Each of the baseline perceptions 212 has a resolution that is lower than a resolution of the composite perception 214 of the field of view. Further, the composite perception 214 has a resolution that is higher than a resolution of the LIDAR sensor 208. Using the composite perception 214 and/or one or more of the baseline perceptions 212, as described herein, an object tracker 216 may detect, identify, classify, and track one or more objects simultaneously in the field of view 104.

Further, the composite perception 214, one or more of the baseline perceptions 212, and/or object tracking data may be utilized by the device subsystems 206 for autonomous decisions, navigation, and/or other actions. For example, the composite perception 214 may be used by a navigation system 216 in generating one or more actions for the mobile device 200, such as generating a motion plan having at least one navigational action for autonomously navigating the autonomous vehicle 102 through the field 104 in view of the objects 108-114. The motion plan may include various operational instructions for an inertial measurement unit (IMU) 218 and/or other subsystems 220 of the autonomous vehicle 102 to autonomously execute to perform the navigational action(s), as well as other action(s).

Figure 3:
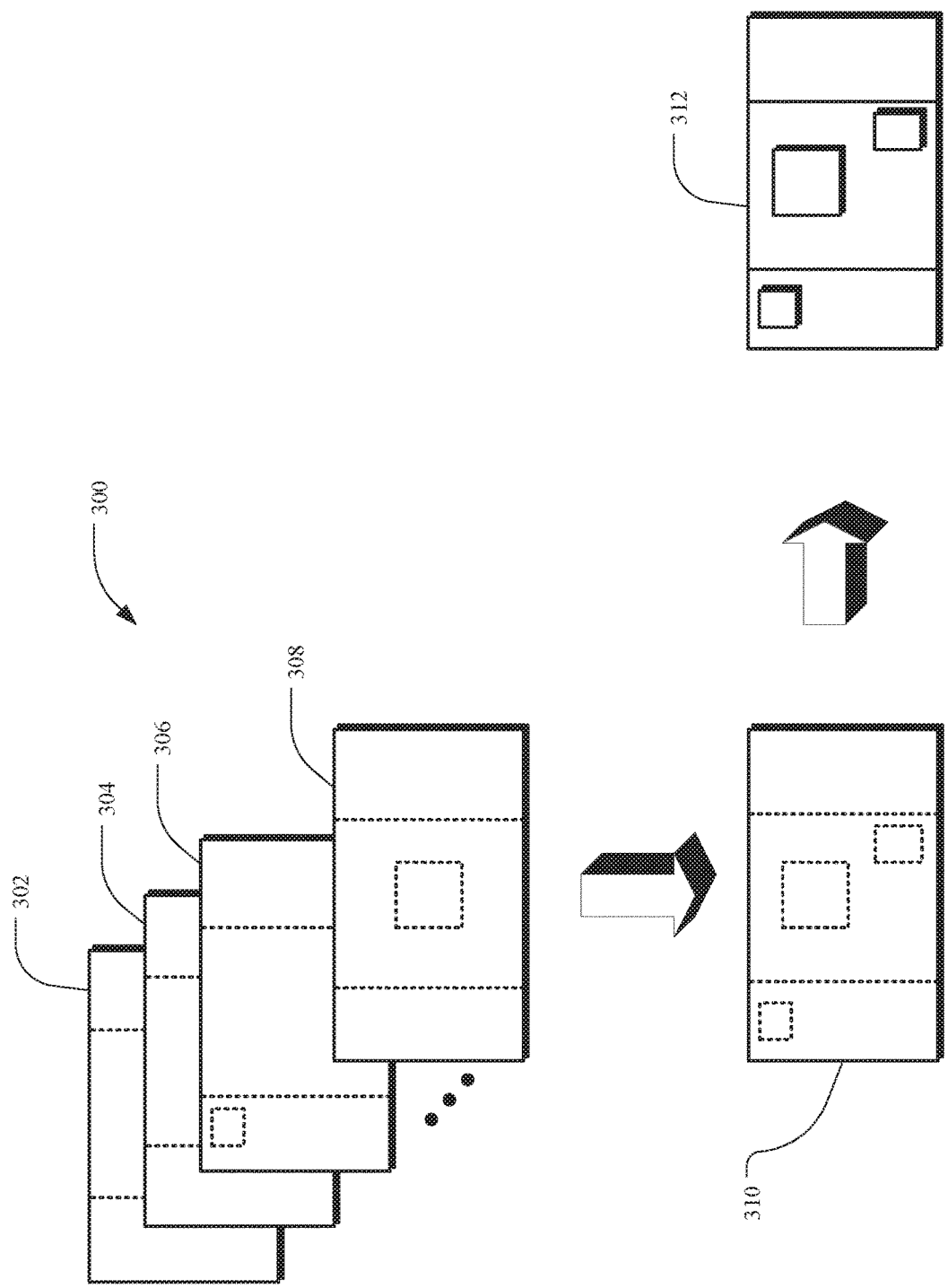
FIG. 3 is a diagram illustrating a generation of an example composite three-dimensional depth map of the field of view around the mobile device by compiling example three-dimensional point cloud representations.

As can be understood from FIG. 3, in one implementation, the baseline perception 212 may include a sequence 300 of baseline images 302-308 is generated based on distance measurements for each scan rotation in a sequence of scan rotations of the LIDAR sensor 208. As described herein, the distance measurements are captured at a unique set of angular scan positions per revolution of the LIDAR sensor 208 over the sequence of scan rotations. Each of the baseline images 302-308 may be a 3D point cloud representation of various surfaces of objects (e.g., one or more of the objects 108-114) in the field of view 104 at a low resolution. The baseline images 302-308 may be used to identify and track large objects, such as the vehicle 108.

However, for a higher resolution perception of the field of view 104, the sequence 300 of baseline images may be compiled into a composite depth map 310 to form the composite perception 214. Stated differently, the composite depth map 310, which may be a composite 3D depth map of the field of view 104, may be generated by compiling each of the baseline images 302-308 for the sequence of scan rotations of the LIDAR sensor 208. In this manner, the composite depth map 310 has a resolution that is higher than each of the baseline images 302-308 and the resolution of the LIDAR sensor 208. Using deep learning or other machine learning techniques, an enhanced perception 312 for object tracking, field of view analysis, and instructions for action by the device subsystems 206 may be generated from the composite depth map 310.

For a more detailed description of an example implementation of the systems and methods for perceiving the field of view 104 around the autonomous vehicle 102 (or other mobile device), reference is made to FIGS. 1-3. In one implementation, the sensor system 202 collects information about the environment of the autonomous vehicle 102, including the field of view 104. The device subsystems 206 of the autonomous vehicle 102, including a computing system 700 illustrated in FIG. 7, may store, receive, or otherwise obtain a navigation map, defining lane connections and nominal vehicle paths for a road area, and a localization map corresponding to the field of view 104. The device subsystems 206 of the autonomous vehicle 102 implements these maps to determine a location and an orientation of the autonomous vehicle 102 in real space. The device subsystems 206 directing movement and operation of the autonomous vehicle 102, such as actuators, to execute various functions are controlled based on the navigation map, the localization map, and outputs of the sensor system 202.

In one implementation, the sensor system 202 includes a set of scanning distance sensors (e.g., the distance sensor(s) 116) in the form of spinning LIDAR sensors 208 arranged on the autonomous vehicle 102. As an example, one LIDAR sensor 208 may be mounted at each corner of the autonomous vehicle 102, or a set of LIDAR sensors 208 may be integrated into a roof rack mounted to the roof of the autonomous vehicle 102. Other arrangements are also contemplated. Each LIDAR sensor 208 can output a 3D LIDAR image (e.g., image 302), such as in the form of a 3D point cloud representing distances between the LIDAR sensor 208 and external surfaces within the field of view 104 of the LIDAR sensor 208. As described herein, the 3D LIDAR image 302 may be output per rotation of the LIDAR sensor 208 (i.e., once per scan rotation). In one implementation, each LIDAR sensor 208 includes a column of pixels (e.g., 16 or 32 pixels arranged in a linear vertical array) mounted on a motorized rotary table. During a scan rotation, the LIDAR sensor 208 rotates the column of pixels and records a distance value from each pixel in the column at each of a plurality (e.g., 1,998.38 . . . ) of radial scan positions to produce the baseline image 302, such as a 3D depth map (or a "LIDAR image") containing a 3D point cloud.

In one implementation, the LIDAR sensor 208 samples the column of pixels at a sequence of radial scan positions that yields a fastest convergence to minimum gap size between columns of distance values recorded by the pixels over multiple scan rotations down to the angular resolution of the LIDAR sensor 208. For example, in the example discussed herein in which the distance sensor 116 samples the column of pixels for distance values at up to 40,000 radial scan positions per second and to track its angular position to an angular resolution of 16,000 points per revolution, the distance sensor 116 may be operated: at 20 Hz (i.e., 1,200 rpm); and at 1,998.38 radial scan positions (i.e., 2,000-φ radial scan positions) per scan rotation. In this example, the distance sensor 116 can therefore converge to a minimum gap size of 0.0225° (or 0.00039 radians) within nine scan rotations.

The autonomous vehicle 102 may capture such distance measurements using the LIDAR sensor 208 and other sensors 210 in the sensor system 202 for use by the perception system 204 when in a static mode or a motion mode. In the static mode, the autonomous vehicle 102 is stopped or parked. In static mode, the perception system 204 may generate a higher-resolution 3D depth map (e.g., the composite perception 214) for calibrating the other sensors 210. For example, after navigating to and stopping at a calibration location or in a maintenance facility, the autonomous vehicle may compile successive individual 3D depth maps 302-308 recorded by the distance sensor 116 over a period of time into a sequence of composite 3D depth maps 310 characterized by a spatial resolution that increases linearly with the number of scan rotations completed by the distance sensor 116. A color camera of the other sensors 210 records concurrent color images, defining a field of view that overlaps the field of view of the distance sensor 116, such as the LIDAR sensor 208. A subset of points may be detected in a sequence of composite 3D depth maps that represent static objects (e.g., that are not moving during this period of time). The color camera may be calibrated to the distance sensor 116 by: detecting vertical edges in a color image; detecting vertical edges among static objects depicted in a concurrent 3D depth map; and calculating a transform that aligns vertical edges in the color image to corresponding vertical edges in the composite 3D depth map. During subsequent operation, the perception system 204 can implement this transform to merge color images recorded by the color camera and 3D depth maps recorded by the distance sensor 116. The perception system 204 can implement similar methods and techniques to simultaneously calibrate other color cameras and distance sensors in the sensor system 202, defining overlapping fields of view, on the autonomous vehicle 102.

In another implementation, an operation of the IMU 218 may be verified based on composite 3D depth maps 310 generated while the autonomous vehicle 102 is static. For example, the autonomous vehicle 102 may be determined to be in static mode over a period of time based on an absence of changes in higher-resolution, composite 3D depth maps generated from individual 3D depth maps recorded over this period of time (or absence of changes in regions of the higher-resolution, composite 3D depth maps known to depict other static or immutable objects). Upon confirming static mode, the IMU 218 is verified by confirming that the IMU 218 is outputting a signal indicating no linear acceleration or angular velocity during this same period of time. On the other hand, motion error of the IMU 218 may be characterized based on a difference between a null motion condition verified by the composite depth scans 310 and concurrent motion values output by the IMU 218. The IMU 218 may be flagged for replacement if the motion error exceeds a threshold. Otherwise, noise in the IMU 218 may be modeled based on the detected difference between the null motion condition verified by the composite depth scans 310 and concurrent motion values output by the IMU 218. The noise model may be implemented to cancel or suppress noise in data output by the IMU 218 during operation.

In one implementation, during the motion mode of the autonomous vehicle 102, a fixed phase offset between consecutive radial scan positions across multiple scan rotations is similarly implemented. Each scan rotation may include a number of radial scan positions that approximates an irrational number, as described herein. The perception system 204 merges lower-resolution 3D depth maps 300 generated during a short sequence of consecutive scan rotations into a higher-resolution composite 3D depth map 310, such as based on a measured change in position of the autonomous vehicle 102 and/or predicted velocities of mutable objects depicted in the 3D depth maps 300 during this period of time.

In one example in which the distance sensor 116 exhibits an angular resolution of 16,000 points per revolution and is capable of sampling the column of pixels 2,000 times per rotation (i.e., up to 2,000 discrete radial scan positions per scan rotation), the distance sensor 116 can: rotate at 20 Hz; and execute 1,998.38 . . . discrete, uniformly-offset radial scan positions per scan rotation such that the column of pixels is sampled at every radial position, in the set of 16,000 discrete radial positions, measurable by the distance sensor within 9 revolutions of the distance sensor (i.e., within 450 milliseconds).

Once a first 3D depth map 302 is generated during a first scan rotation in this sequence of 9 revolutions of the distance sensor 116, the perception system 204 inserts this first 3D depth map 302 (and concurrent data collected by the other sensors 210) into an occupancy grid to generate a gross representation of objects in the field 104 nearby and elect and execute navigational actions to avoid collision with these objects. The process may be repeated for each subsequent 3D depth map in the sequence 300 generated during this sequence of 9 revolutions of the distance sensor 116.

In this example, the perception system 204 may integrate a measured velocity of the autonomous vehicle 102 over the duration of nine scan rotations to estimate a change in absolute position over this period of time. For the first depth image 302 generated in this sequence 300 of 9 scan rotations, the perception system 204 extrapolates positions of points in the first depth image 302 forward to the time of the ninth scan rotation in the sequence 300 based on the change in the absolute position of the autonomous vehicle 102 over the period of time. Similarly, for the second depth image 304 generated in the sequence 300 of 9 scan rotations, the perception system 204 extrapolates positions of points in the second depth image 304 forward to the time of the ninth scan rotation in the sequence 300 based on the change in the absolute position over the period of time. The extrapolation to obtain adjusted distance values may be repeated for each other depth image generated during the sequence 300 of scan rotations.

The perception system 204 combines points in the sequence of 3D depth maps 300, corrected for the change in position of the autonomous vehicle 102 since the 3D depth maps were recorded, into a first composite image 310 that represents the field 104 around the autonomous vehicle 102 during this 450-millisecond period with a higher-resolution (e.g., 8-times higher resolution). The perception system 204 may utilize a deep learning perception pipeline to process the first composite 3D depth map 310 for generating the enhanced perception 312 to detect and identify discrete objects in the field 104 during this 450-millisecond period. In particular, the perception system 204 can generate a composite 3D depth map 310 that contains a relative high density of data, which may enable the perception system 204 to identify types of these objects and predict motion or trajectories of these objects with relatively high accuracy.

Furthermore, the perception system 204 can: repeat this process for a next sequence of 9 scan rotations (e.g., a discrete set of 9 depth images or a rolling set of 9 depth images) to generate a second composite 3D depth map; use this second composite 3D depth map to detect and identify discrete objects in the field 104 during this period of time; track objects between the first and second composite 3D depth maps; and estimate velocities of the objects based on their changes in position depicted in these composite 3D depth maps. The autonomous vehicle 102 can elect and execute navigational actions to avoid collision with the objects based on current locations, derived velocities, and predicted trajectories of these objects thus derived from the sequence of depth images.

In connection with object tracking or otherwise, dynamic radial scan positions may be utilized involving phase offsets between consecutive radial scan positions across multiple scan rotations may be set to track objects in the field 104 around the autonomous vehicle 102, to verify velocities of these objects, and/or to determine extents (e.g., lengths, geometries, orientations) of the objects.

Further in connection with object tracking, in one implementation where an object of interest is detected in far in the field of view 104 (e.g., more than 50 meters from the autonomous vehicle 102) in a first 3D depth map 302 recorded during a first scan rotation of the distance sensor 116, the object of interest may be tracked in 3D depth maps in the sequence 300 generated during subsequent scan rotations. A velocity of the object of interest (e.g., its absolute velocity or velocity relative to the autonomous vehicle 102) may be predicted based on positions of points depicting this object of interest in these subsequent depth images.

A position of the object of interest (or the position of a particular segment of the object of interest identified in the first 3D depth scan) in the field 104 relative to the autonomous vehicle 102 may be predicted during a next scan rotation based on the predicted velocity of the object of interest and the velocity of the autonomous vehicle 102 over this period of time. A set of radial scan positions may be defined for the next scan rotation to include at least one radial scan position that aligns with (or "intersects") the predicted position of the object of interest (or the predicted position of the particular segment of the object of interest) during the next scan rotation.

More specifically, the autonomous vehicle 102 (e.g., the perception system 204) tracks at least one radial scan position in the next scan rotation to the object of interest based on the predicted velocity of the object of interest such that the column of pixels in the distance sensor 116 is radially (e.g., horizontally) aligned with the same vertical segment of the object over a sequence of scan rotations. The distance sensor 116 obtains the set of radial scan positions for execution during the next scan rotation. The autonomous vehicle 102 can repeat this process over subsequent scan rotations to track the object of interest over a period of time. The predicted velocity of the object of interest may be verified if distance data recorded by the column of pixels, when occupying radial scan positions predicted to align with the object of interest, continues to depict the object of interest or the particular segment on the object of interest. If not, the predicted velocity of the object of interest may be modified. For example, if the distance data, collected by the column of pixels while occupying a next radial scan position predicted to align with the object of interest, depicts a different surface (e.g., face or side) of the object of interest (e.g., a side of a truck then a rear of the truck) or no longer depicts the object of interest, the prediction for the velocity of the object of interest may be modified. The distance sensor 116 may rescan the field 104 for the object of interest, and repeat the process to track the object of interest based on the updated velocity prediction. Thus, the autonomous vehicle 102 can track at least one radial scan position executed by the distance sensor over a sequence of scan rotations to the object of interest to track the autonomous vehicle 102 and to maintain an accurate prediction of the (absolute or relative) velocity of the object of interest over time.

If the object of interest is far (e.g., more than 80 meters) from the autonomous vehicle 102 in the field of view 104, the next scan rotation of the distance sensor may not yield a radial scan position that is aligned with the object of interest. As such, 3D depth maps thus generated during these next scan rotations may not depict the object of interest. More specifically, a probability that consecutive 3D depth maps will not depict an object may increase with small object size, greater object distance, and/or duration of time spanned by the 3D depth maps. Lack of data representing the object of interest in all or even a subset of the next 3D depth maps may impede or prevent the autonomous vehicle 102 from tracking the object of interest throughout the 3D depth maps. Therefore, in one implementation, once the autonomous vehicle 102 detects a small, mutable object (e.g., a dog, a cyclist) at a long distance from the autonomous vehicle 102 and moving toward the autonomous vehicle 102, the autonomous vehicle 102 aligns at least one radial scan position in each scan rotation, in a subsequent sequence of scan rotations, to the object. The object is continuously tracked and thus depicted in 3D depth maps generated during these subsequent scan rotations. Navigational actions to avoid the object as the autonomous vehicle 102 and the object approach one another may be executed based on the tracking of the object in the 3D depth maps. As such, the autonomous vehicle 102 perceives a moving object at a large distance from the autonomous vehicle 102, track the object over time, and executes preemptive navigational actions to avoid the object.

In addition to object tracking, an object extent of the various objects in the field 104 of the autonomous vehicle 102 may be determined. In one implementation, once an object is detected in a 3D depth map generated during a scan rotation, the autonomous vehicle 102: shifts radial scan positions, executed by the distance sensor 116 during subsequent scan rotations, laterally relative to last detected positions of the object of interest or relative to next predicted locations of the object of interest; and estimates the lateral extent of the object of interest and an orientation of the object of interest based on data recorded at these radial scan positions over this sequence of scan rotations.

For example, during an initial sequence of scan rotations, the autonomous vehicle 112 detects an object of interest in far the field of view 104. The object of interest is tracked in 3D depth maps generated during the scan rotations, and a velocity of the object of interest (e.g., its absolute velocity or velocity relative to the autonomous vehicle) is predicted. The velocity of the object of interest is verified as described herein. During a next sequence of scan rotations, the autonomous vehicle 102 identifies a first column of points in a current, first 3D depth map that depicts a first segment of the object of interest and that was recorded by the column of pixels when occupying a first radial scan position. Assuming a constant absolute velocity of the object of interest and correcting for the absolute velocity of the autonomous vehicle 102 from the first scan rotation to a next, second scan rotation, a second position of the first segment of the object of interest relative to the autonomous vehicle during the second scan rotation is extrapolated. A radial scan position aligned with the predicted second position of the first segment is estimated, and a second radial scan position for the second scan rotation is defined offset radially (e.g., to the right) of the radial scan position predicted to align with the predicted second position of the first segment of the object of interest. The second radial scan position is used by distance sensor 116 during this second scan rotation. A second 3D depth map containing a second set of points recorded by the column of pixels while occupying the second radial scan position is generated.

The autonomous vehicle 102 can repeat this process for a next, third scan rotation. For example, a third radial scan position, offset radially further to the right of a radial scan position predicted to align with a predicted third position of the first segment of the object of interest, is defined for a third scan rotation. A third 3D depth map containing a third set of points recorded by the column of pixels in the distance sensor while occupying the third radial scan position and predicted to depict a third segment of the object of interest is generated. Again, the autonomous vehicle 102 can repeat this process for a next, fourth scan rotation, where a fourth radial scan position, offset radially to the left of a radial scan position predicted to align with a predicted fourth position of the first segment of the object of interest, is defined for a fourth scan rotation. A fourth 3D depth map containing a fourth set of points recorded by the column of pixels in the distance sensor while occupying the fourth radial scan position and predicted to depict a fourth segment of the object of interest is generated. A fifth radial scan position, offset radially further to the left of a radial scan position predicted to align with a predicted fifth position of the first segment of the object of interest, may be for a fifth scan rotation. A fifth 3D depth map containing a fifth set of points recorded by the column of pixels in the distance sensor while occupying the fifth radial scan position and predicted to depict a fifth segment of the object of interest is generated.

In one implementation, positions of the first, second, third, fourth, and fifth sets of points, which are predicted to depict the first, second, third, fourth, and fifth segments of the object of interest in these five 3D depth maps, are extrapolated to the current time based on the last predicted or verified velocity of the object of interest and the measured velocity of the autonomous vehicle 102. These adjusted first, second, third, fourth, and fifth sets of points are aggregated, and these aggregated points are scanned for vertical edges, corners, inflections, or offset surfaces that indicate orthogonal faces of the object of interest from the current perspective of the autonomous vehicle 102. The extent of the object of interest is derived based on the orthogonal faces of the object of interest. However, if an edge corner, inflection, or offset surface of the object is not detected in the aggregated set of points, the foregoing process may be repeated to collect additional data depicting the object of interest and recorded at a different relative radial scan position. The additional data may be aggregated and rescanned for vertical edges, corners, inflections, or offset surfaces indicative of orthogonal faces and the extent of the object of interest.

Once the extent of the object of interest is determined, a scale (e.g., a length and height) of the object of interest may be derived from the current perspective of the autonomous vehicle 102. The scale data and other 3D point cloud data depicting the object of interest and recorded over this sequence of scan rotations may be utilized by the perception system 204, for example according to a deep learning model, a computer vision pipeline, and/or the like, to predict a type or class of the object of interest (e.g., a pedestrian, a cyclist, a passenger vehicle, a truck). Furthermore, if the object of interest is large enough and/or close enough to the autonomous vehicle 102, the autonomous vehicle 102 can implement similar methods and techniques to: scan multiple vertical segments of the object of interest during each scan rotation; compile points depicting the segments in a sequence of 3D depths maps; and scan the aggregated points for edges, corners, or inflections indicative of orthogonal faces and the extent of the object of interest.

As described herein, multiple objects may be detected, identified, tracked, and/or the like simultaneously. Stated differently, multiple objects in the field 104 may be processed simultaneously per scan rotation and simultaneously over a sequence of scan rotations. In one implementation, a table, list, or other data format containing a set of target radial scan positions, such as calculated as described above is generated. The table may be used by the distance sensor 116 to inform radial positions at which the distance sensor 116 samples the column of pixels for distance values during the next scan rotation.

In one implementation, multiple objects in the field 104 are detected in one or over a sequence of 3D depth maps. A first subset of objects is selected in the set to track over subsequent scan rotations, and target radial scan positions predicted to align with the centers of objects in this first subset of objects are calculated based on their velocities relative to the autonomous vehicle 102. A second subset of objects is selected in the set to scan for their horizontal extents. Target radial scan positions offset to the left or right of last detected surfaces of objects are set in this second subset of objects based on their velocities relative to the autonomous vehicle 102. The target radial scan positions are ranked, such as by speed, size, and/or type of the corresponding objects or by a priority for calibrating to external surfaces versus tracking eternal objects. A list of radial scan positions may be generated that aligns with or falls nearest a maximum number of the target radial scan positions for the first and second subsets of objects weighted by rank and for which adjacent radial scan positions are offset by at least a minimum radial offset of the distance sensor 116 (e.g., 0.18° for the distance sensor configured to sample the column of pixels 2000 times per scan rotation) or that correspond to a minimum recharge time for light emitters (e.g., laser diodes) in the distance sensor 116. Gaps in this table, such as between the target radial scan positions, may be filled with a maximum number of radial scan positions permitted by a minimum radial offset or recharge time of optical emitters in the distance sensor 116. Therefore, a list of radial scan positions may be generated that defines radial scan positions not uniformly offset within one scan rotation and across multiple consecutive scan rotations. The distance sensor 116 may utilized the list for execution during the next scan rotation, and the process may be repeated for subsequent scan rotations.

In another implementation, radial scan positions may be defined in the form of phase offsets from a nominal minimum phase offset of the distance sensor (e.g., 0.18°), and a list of phase offsets may be used by the distance sensor 116 before the distance sensor 116 initiates the next scan rotation (e.g., reaches a 0° azimuthal position). Alternatively, the autonomous vehicle 102 can implement similar methods to calculate radial scan positions or phase offsets in (near) real-time and then stream these values to the distance sensor 116 for execution during the current or next scan rotation.

In connection with a fixed radial scan position, a fixed phase offset between consecutive radial scan positions may be implemented across multiple scan rotations, as described above, to isolate a target radial scan position within a 3D depth map, generated during a current scan rotation, that aligns with a particular segment of an object of interest in the field 104. The process may be repeated for a subsequent sequence of 3D depth maps generated over multiple consecutive scan rotations, with the object of interest being tracked over this period of time or the extent of the object of interest being derived based on target radial scan positions predicted to depict particular segments of the object of interest in these scan rotations.

In one implementation, the distance sensor 116 may be transitioned to a fixed set of radial scan positions (i.e., an identical sequence of radial scan positions) across consecutive scan rotations. In this case, a set of 3D depth maps generated during these scan rotations may be aggregated, and immutable objects depicted in these 3D depth maps may be identified. Absolute changes in the position and orientation of the autonomous vehicle 102 may be estimated based on changes in positions of points depicting the immutable objects over the sequence of 3D depth maps. The IMU 218 may be validated or calibrated based on the absolute changes in the position and orientation derived from data recorded by the distance sensor 116.

Figure 4:
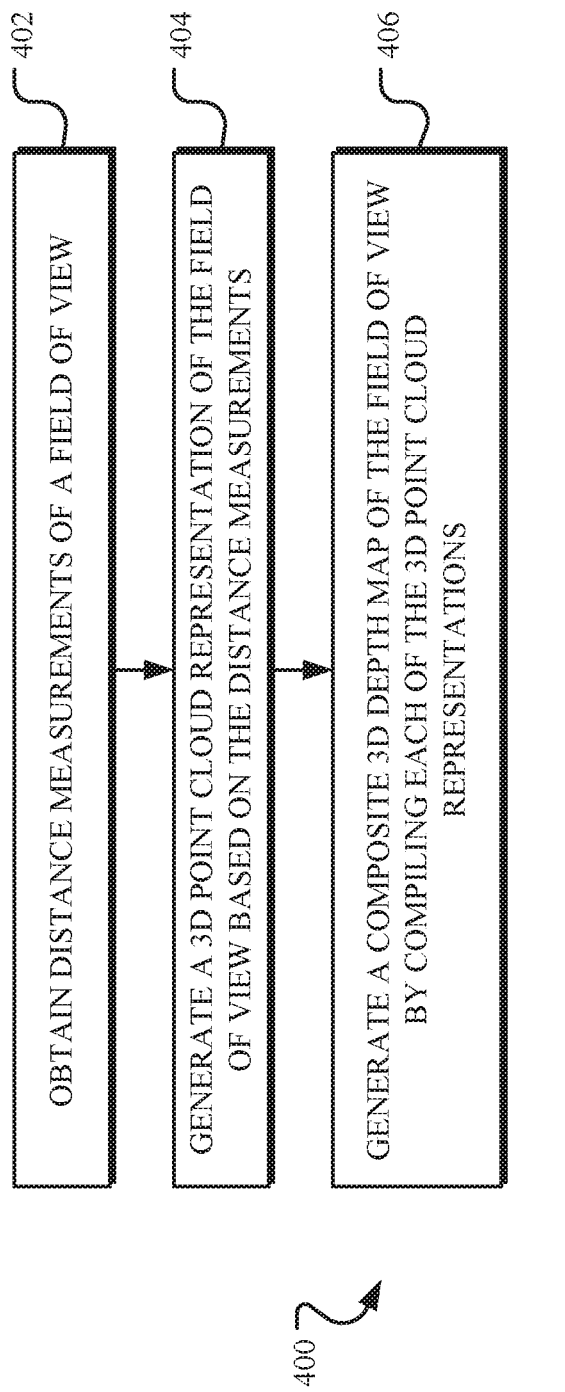
FIG. 4 illustrates example operations for perceiving a field of view around a mobile device.

Turning to FIG. 4, example operations 400 for perceiving a field of view around a mobile device. In one implementation, an operation 402 obtains distance measurements of the field of view. The distance measurements are captured at a unique set of angular scan positions per revolution of a distance sensor over a sequence of scan rotations. More particularly, the distance measurements are captured by rotating a column of pixels in the distance sensor over a different sequence of angular scan positions from one scan rotation to another scan rotation in the sequence of scan rotations. A number of angular scan positions in the different sequence of angular scan positions for each scan rotation in the sequence of scan rotations may be based on an irrational number.

In one implementation, an operation 404 generates a 3D point cloud representation of the field of view based on the distance measurements for each scan rotation in the sequence of scan rotations. Each point in the 3D point cloud representation for a corresponding scan rotation in the sequence of scan rotations may represent a 3D position of at least one surface in the field of view captured by a pixel in the column of pixels when the distance sensor is occupying a discrete angular position at a distance time during the corresponding scan rotation. The at least one surface may correspond to one or more objects in the field of view.

An operation 406 generates a composite 3D depth map of the field of view by compiling each of the 3D point cloud representations for the sequence of scan rotations. In one implementation, the composite 3D depth map of the field of view includes a first set of distances between the at least one surface in the field of view represented by adjacent points, with the first set of distances being shorter than a second set of distances corresponding to a native spatial resolution of the distance sensor. Each of the 3D point cloud representations has a resolution that is lower than a resolution of the composite 3D depth map of the field of view.

Using the composite 3D depth map, one or more objects in the field of view may be tracked simultaneously, and an object type, an object extent, an object trajectory, an object geometry, and/or the like of one or more objects may be determined using the composite 3D depth map of the field of view.

Figure 5:
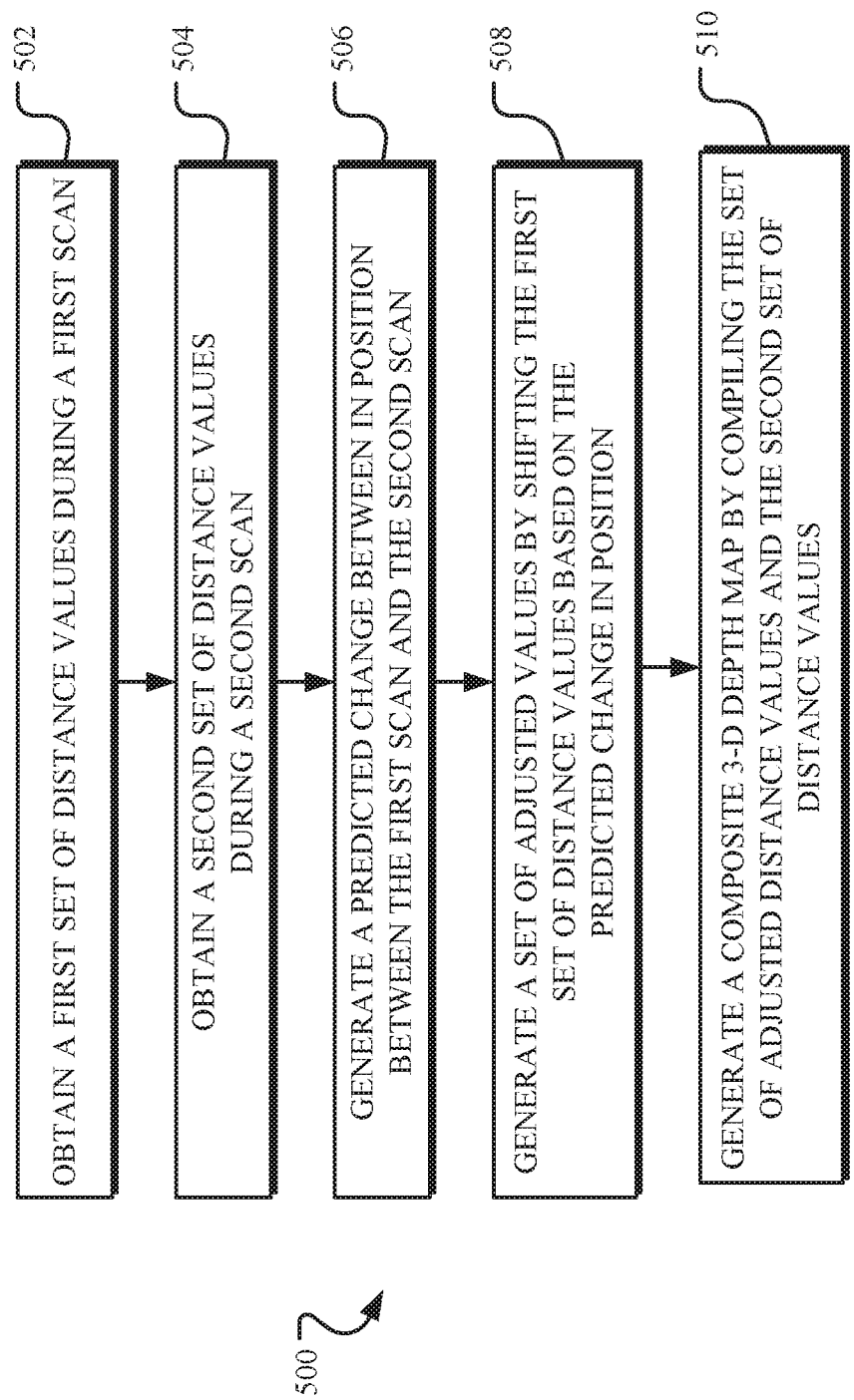
FIG. 5 illustrates example operations for perceiving a field of view around a mobile device.

Turning to FIG. 5, example operations 500 for perceiving a field of view around a mobile device. In one implementation, an operation 502 obtains a first set of distance values of the field around the mobile device. The first set of distance values are captured by rotating a distance sensor during a first scan rotation. More particularly, the first set of distance values may be captured by rotating a column of pixels about an azimuthal axis at a first plurality of unique angular scan positions using the distance sensor. The number of the first plurality of unique angular scan positions may be less than an angular resolution of the distance sensor.

An operation 504 obtains a second set of distance values of the field around the mobile device. The second set of distance values are captured by rotating the distance sensor during a second scan rotation that is subsequent to the first scan rotation. In one implementation, the second set of distance values is captured by rotating the column of pixels at a second plurality of unique angular scan positions using the distance sensor. The second plurality of unique angular scan positions may be angularly offset from the first plurality of unique angular scan positions. Moreover, a number of the second plurality of unique angular scan positions may be less than the number of the first plurality of unique angular scan positions. At least one of the number of the first plurality of unique angular scan positions or the second plurality of unique angular scan positions may correspond to an irrational number. For example, the number of the first and/or second plurality of unique angular scan positions may be equal to or approximate an irrational number.

In one implementation, an operation 506 generates a predicted change in position between a first position of the mobile device and a second position of the mobile device. The first position corresponds to the first scan rotation and the second position corresponds to the second scan rotation. An operation 508 generates a set of adjusted distance values by shifting the first set of distance values based on the predicted change in position, and an operation 510 generates a composite 3D depth map of the field around the mobile device by compiling the set of adjusted distance values and the second set of distance values. In one implementation, a motion plan is generated for the mobile device based on the composite 3D depth map of the field, with the motion plan including at least one navigational action for execution by the mobile device. In cases where the mobile device is an autonomous vehicle, the autonomous vehicle may be autonomously navigated through the field based on the at least one navigational action. Further, one or more objects may be detected in the field around the mobile device using the composite 3D depth map of the field. An object type, object extent, object trajectory, object geometry, and/or the like of the one or more objects may be determined using the composite 3D depth map of the field. In some cases, the one or more objects may be tracked within the field around the mobile device simultaneously using the composite 3D depth map of the field.

Figure 6:
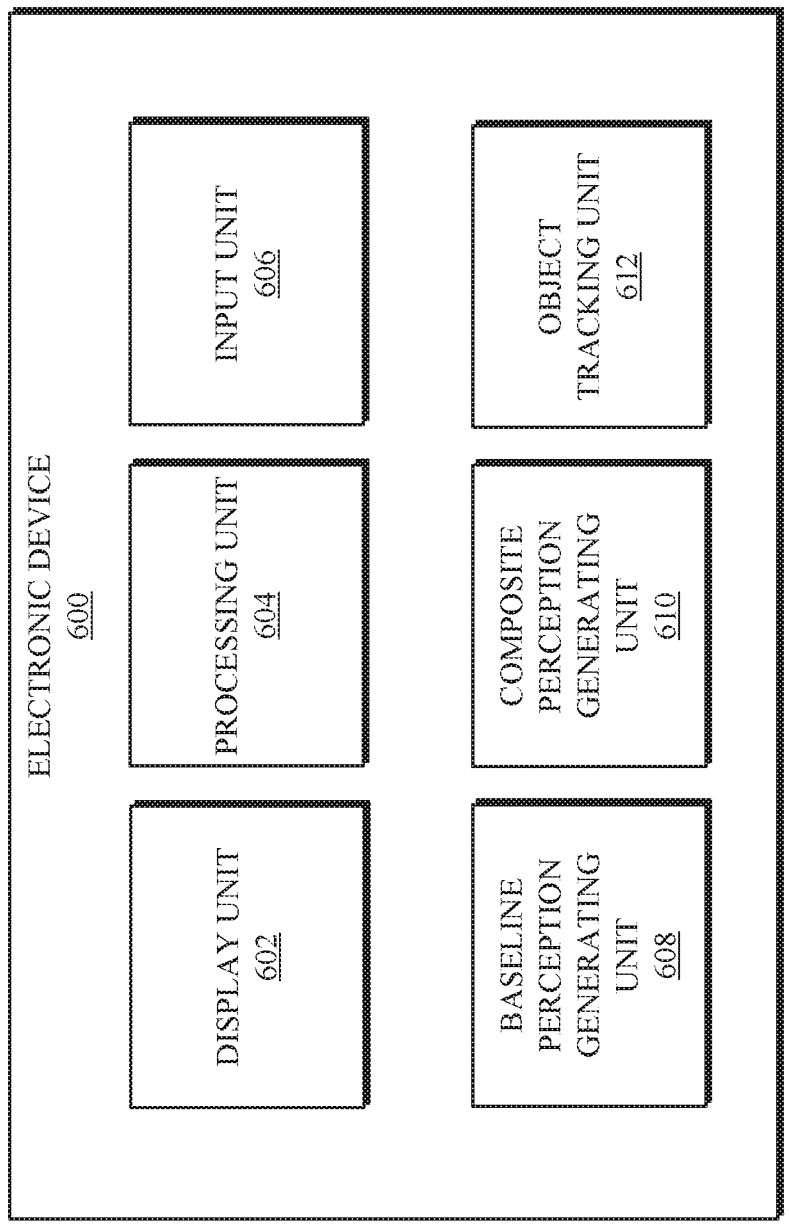
FIG. 6 is a functional block diagram of an electronic device including operational units arranged to perform various operations of the presently disclosed technology.

Turning to FIG. 6, an electronic device 600 including operational units 602-612 arranged to perform various operations of the presently disclosed technology is shown. The operational units 602-612 of the device 600 are implemented by hardware or a combination of hardware and software to carry out the principles of the present disclosure. It will be understood by persons of skill in the art that the operational units 602-612 described in FIG. 6 may be combined or separated into sub-blocks to implement the principles of the present disclosure. Therefore, the description herein supports any possible combination or separation or further definition of the operational units 602-612.

In one implementation, the electronic device 600 includes a display unit 602 configured to display information, such as a graphical user interface, and a processing unit 604 in communication with the display unit 602 and an input unit 606 configured to receive data from one or more input devices or systems. Various operations described herein may be implemented by the processing unit 604 using data received by the input unit 606 to output information for display using the display unit 602.

Additionally, in one implementation, the electronic device 600 includes units implementing the operations described with respect to FIG. 4. For example, the operations 402-404 may be implemented by a baseline perception generating unit 608, and the operation 406 may be implemented with a composite perception generating unit 610. Other operations involving object tracking, identification, classification, detection, and/or the like may be implemented with an object tracking unit 612. Each of these units may execute the corresponding operations with one or more computing units. In some implementations, a controlling unit implements various operations for controlling the operation of a vehicle based on the operations implemented by the units 602-612.

Figure 7:
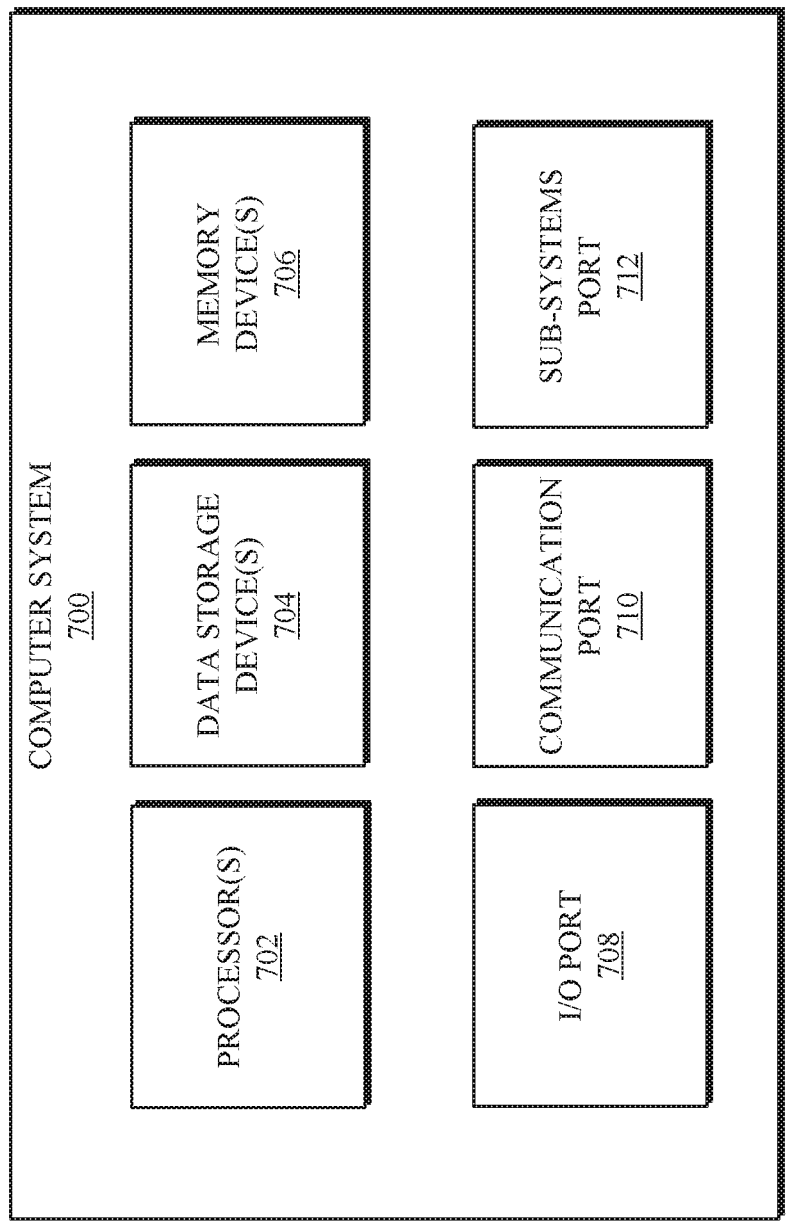
FIG. 7 is an example computing system that may implement various aspects of the presently disclosed technology.

Referring to FIG. 7, a detailed description of an example computing system 700 having one or more computing units that may implement various systems and methods discussed herein is provided. The computing system 700 may be applicable to the measuring system 102 and other computing or network devices. It will be appreciated that specific implementations of these devices may be of differing possible specific computing architectures not all of which are specifically discussed herein but will be understood by those of ordinary skill in the art.

The computer system 700 may be a computing system is capable of executing a computer program product to execute a computer process. Data and program files may be input to the computer system 700, which reads the files and executes the programs therein. Some of the elements of the computer system 700 are shown in FIG. 7, including one or more hardware processors 702, one or more data storage devices 704, one or more memory devices 706, and/or one or more ports 708-712. Additionally, other elements that will be recognized by those skilled in the art may be included in the computing system 700 but are not explicitly depicted in FIG. 7 or discussed further herein. Various elements of the computer system 700 may communicate with one another by way of one or more communication buses, point-to-point communication paths, or other communication means not explicitly depicted in FIG. 7.

The processor 702 may include, for example, a central processing unit (CPU), a microprocessor, a microcontroller, a digital signal processor (DSP), and/or one or more internal levels of cache. There may be one or more processors 702, such that the processor 702 comprises a single central-processing unit, or a plurality of processing units capable of executing instructions and performing operations in parallel with each other, commonly referred to as a parallel processing environment.

The computer system 700 may be a conventional computer, a distributed computer, or any other type of computer, such as one or more external computers made available via a cloud computing architecture. The presently described technology is optionally implemented in software stored on the data stored device(s) 704, stored on the memory device(s) 706, and/or communicated via one or more of the ports 708-712, thereby transforming the computer system 700 in FIG. 7 to a special purpose machine for implementing the operations described herein. Examples of the computer system 700 include personal computers, terminals, workstations, mobile phones, tablets, laptops, personal computers, multimedia consoles, gaming consoles, set top boxes, and the like.

The one or more data storage devices 704 may include any non-volatile data storage device capable of storing data generated or employed within the computing system 700, such as computer executable instructions for performing a computer process, which may include instructions of both application programs and an operating system (OS) that manages the various components of the computing system 700. The data storage devices 704 may include, without limitation, magnetic disk drives, optical disk drives, solid state drives (SSDs), flash drives, and the like. The data storage devices 704 may include removable data storage media, non-removable data storage media, and/or external storage devices made available via a wired or wireless network architecture with such computer program products, including one or more database management products, web server products, application server products, and/or other additional software components. Examples of removable data storage media include Compact Disc Read-Only Memory (CD-ROM), Digital Versatile Disc Read-Only Memory (DVD-ROM), magneto-optical disks, flash drives, and the like. Examples of non-removable data storage media include internal magnetic hard disks, SSDs, and the like. The one or more memory devices 706 may include volatile memory (e.g., dynamic random access memory (DRAM), static random access memory (SRAM), etc.) and/or non-volatile memory (e.g., read-only memory (ROM), flash memory, etc.).

Computer program products containing mechanisms to effectuate the systems and methods in accordance with the presently described technology may reside in the data storage devices 704 and/or the memory devices 706, which may be referred to as machine-readable media. It will be appreciated that machine-readable media may include any tangible non-transitory medium that is capable of storing or encoding instructions to perform any one or more of the operations of the present disclosure for execution by a machine or that is capable of storing or encoding data structures and/or modules utilized by or associated with such instructions. Machine-readable media may include a single medium or multiple media (e.g., a centralized or distributed database, and/or associated caches and servers) that store the one or more executable instructions or data structures.

In some implementations, the computer system 700 includes one or more ports, such as an input/output (I/O) port 708, a communication port 710, and a sub-systems port 712, for communicating with other computing, network, or vehicle devices. It will be appreciated that the ports 708-712 may be combined or separate and that more or fewer ports may be included in the computer system 700.

The I/O port 708 may be connected to an I/O device, or other device, by which information is input to or output from the computing system 700. Such I/O devices may include, without limitation, one or more input devices, output devices, and/or environment transducer devices.

In one implementation, the input devices convert a human-generated signal, such as, human voice, physical movement, physical touch or pressure, and/or the like, into electrical signals as input data into the computing system 700 via the I/O port 708. Similarly, the output devices may convert electrical signals received from computing system 700 via the I/O port 708 into signals that may be sensed as output by a human, such as sound, light, and/or touch. The input device may be an alphanumeric input device, including alphanumeric and other keys for communicating information and/or command selections to the processor 702 via the I/O port 708. The input device may be another type of user input device including, but not limited to: direction and selection control devices, such as a mouse, a trackball, cursor direction keys, a joystick, and/or a wheel; one or more sensors, such as a camera, a microphone, a positional sensor, an orientation sensor, a gravitational sensor, an inertial sensor, and/or an accelerometer; and/or a touch-sensitive display screen ("touchscreen"). The output devices may include, without limitation, a display, a touchscreen, a speaker, a tactile and/or haptic output device, and/or the like. In some implementations, the input device and the output device may be the same device, for example, in the case of a touchscreen.

The environment transducer devices convert one form of energy or signal into another for input into or output from the computing system 700 via the I/O port 708. For example, an electrical signal generated within the computing system 700 may be converted to another type of signal, and/or vice-versa. In one implementation, the environment transducer devices sense characteristics or aspects of an environment local to or remote from the computing device 700, such as, light, sound, temperature, pressure, magnetic field, electric field, chemical properties, physical movement, orientation, acceleration, gravity, and/or the like. Further, the environment transducer devices may generate signals to impose some effect on the environment either local to or remote from the example computing device 700, such as, physical movement of some object (e.g., a mechanical actuator), heating or cooling of a substance, adding a chemical substance, and/or the like.

In one implementation, a communication port 710 is connected to a network by way of which the computer system 700 may receive network data useful in executing the methods and systems set out herein as well as transmitting information and network configuration changes determined thereby. Stated differently, the communication port 710 connects the computer system 700 to one or more communication interface devices configured to transmit and/or receive information between the computing system 700 and other devices by way of one or more wired or wireless communication networks or connections. Examples of such networks or connections include, without limitation, Universal Serial Bus (USB), Ethernet, Wi-Fi, Bluetooth®, Near Field Communication (NFC), Long-Term Evolution (LTE), and so on. One or more such communication interface devices may be utilized via the communication port 710 to communicate one or more other machines, either directly over a point-to-point communication path, over a wide area network (WAN) (e.g., the Internet), over a local area network (LAN), over a cellular (e.g., third generation (3G), fourth generation (4G) network, or fifth generation (5G)), network, or over another communication means. Further, the communication port 710 may communicate with an antenna for electromagnetic signal transmission and/or reception. In some examples, an antenna may be employed to receive Global Positioning System (GPS) data to facilitate determination of a location of a machine, vehicle, or another device.

The computer system 700 may include a sub-systems port 712 for communicating with one or more systems related to a vehicle to control an operation of the vehicle and/or exchange information between the computer system 700 and one or more sub-systems of the vehicle. Examples of such sub-systems of a vehicle, include, without limitation, imaging systems, radar, lidar, motor controllers and systems, battery control, fuel cell or other energy storage systems or controls in the case of such vehicles with hybrid or electric motor systems, autonomous or semi-autonomous processors and controllers, steering systems, brake systems, light systems, navigation systems, environment controls, entertainment systems, and the like.

In an example implementation, distance measurements, perceptions, depth maps, representations, motion plans, and software and other modules and services may be embodied by instructions stored on the data storage devices 704 and/or the memory devices 706 and executed by the processor 702. The computer system 700 may be integrated with or otherwise form part of a vehicle. In some instances, the computer system 700 is a portable device that may be in communication and working in conjunction with various systems or sub-systems of a vehicle.

The present disclosure recognizes that the use of such information may be used to the benefit of users. For example, the location information of a vehicle may be used to provide targeted information concerning a "best" path or route to the vehicle and to avoid objects and navigate through a field of view. Accordingly, use of such information enables calculated control of an autonomous vehicle. Further, other uses for location information that benefit a user of the vehicle are also contemplated by the present disclosure.

Users can selectively block use of, or access to, personal data, such as location information. A system incorporating some or all of the technologies described herein can include hardware and/or software that prevents or blocks access to such personal data. For example, the system can allow users to "opt in" or "opt out" of participation in the collection of personal data or portions thereof. Also, users can select not to provide location information, or permit provision of general location information (e.g., a geographic region or zone), but not precise location information.

Entities responsible for the collection, analysis, disclosure, transfer, storage, or other use of such personal data should comply with established privacy policies and/or practices. Such entities should safeguard and secure access to such personal data and ensure that others with access to the personal data also comply. Such entities should implement privacy policies and practices that meet or exceed industry or governmental requirements for maintaining the privacy and security of personal data. For example, an entity should collect users' personal data for legitimate and reasonable uses and not share or sell the data outside of those legitimate uses. Such collection should occur only after receiving the users' informed consent. Furthermore, third parties can evaluate these entities to certify their adherence to established privacy policies and practices.

The system set forth in FIG. 7 is but one possible example of a computer system that may employ or be configured in accordance with aspects of the present disclosure. It will be appreciated that other non-transitory tangible computer-readable storage media storing computer-executable instructions for implementing the presently disclosed technology on a computing system may be utilized.

In the present disclosure, the methods disclosed may be implemented as sets of instructions or software readable by a device. Further, it is understood that the specific order or hierarchy of steps in the methods disclosed are instances of example approaches. Based upon design preferences, it is understood that the specific order or hierarchy of steps in the method can be rearranged while remaining within the disclosed subject matter. The accompanying method claims present elements of the various steps in a sample order, and are not necessarily meant to be limited to the specific order or hierarchy presented.

The described disclosure may be provided as a computer program product, or software, that may include a non-transitory machine-readable medium having stored thereon instructions, which may be used to program a computer system (or other electronic devices) to perform a process according to the present disclosure. A machine-readable medium includes any mechanism for storing information in a form (e.g., software, processing application) readable by a machine (e.g., a computer). The machine-readable medium may include, but is not limited to, magnetic storage medium, optical storage medium; magneto-optical storage medium, read only memory (ROM); random access memory (RAM); erasable programmable memory (e.g., EPROM and EEPROM); flash memory; or other types of medium suitable for storing electronic instructions.

While the present disclosure has been described with reference to various implementations, it will be understood that these implementations are illustrative and that the scope of the present disclosure is not limited to them. Many variations, modifications, additions, and improvements are possible. More generally, embodiments in accordance with the present disclosure have been described in the context of particular implementations. Functionality may be separated or combined in blocks differently in various embodiments of the disclosure or described with different terminology. These and other variations, modifications, additions, and improvements may fall within the scope of the disclosure as defined in the claims that follow.

What is claimed is:

1. A method for perceiving a field external to a mobile device, the method comprising:
   obtaining a first set of distance values of the field external to the mobile device, the first set of distance values captured by rotating a distance sensor during a first scan rotation;
   obtaining a second set of distance values of the field external to the mobile device, the second set of distance values captured by rotating the distance sensor during a second scan rotation subsequent to the first scan rotation;
   generating a predicted change in position between a first position of the mobile device and a second position of the mobile device, the first position corresponding to the first scan rotation and the second position corresponding to the second scan rotation;
   generating a set of adjusted distance values by shifting the first set of distance values based on the predicted change in position; and
   generating a composite three-dimensional depth map of the field external to the mobile device by compiling the set of adjusted distance values and the second set of distance values.

2. The method of claim 1, wherein the first set of distance values is captured by rotating a column of pixels about an azimuthal axis at a first plurality of unique angular scan positions using the distance sensor.

3. The method of claim 2, wherein a number of the first plurality of unique angular scan positions is less than an angular resolution of the distance sensor.

4. The method of claim 2, wherein the second set of distance values is captured by rotating the column of pixels at a second plurality of unique angular scan positions using the distance sensor.

5. The method of claim 4, wherein the second plurality of unique angular scan positions is angularly offset from the first plurality of unique angular scan positions.

6. The method of claim 4, wherein a number of the second plurality of unique angular scan positions is less than a number of the first plurality of unique angular scan positions.

7. The method of claim 6, wherein at least one of the number of the first plurality of unique angular scan positions or the number of the second plurality of unique angular scan positions corresponds to an irrational number.

8. The method of claim 1, further comprising:
generating a motion plan for the mobile device based on the composite three-dimensional depth map of the field, the motion plan including at least one navigational action for execution by the mobile device.

9. The method of claim 8, wherein the mobile device is an autonomous vehicle, the autonomous vehicle being autonomously directed through the field based on the at least one navigational action.

10. The method of claim 1, further comprising:
detecting one or more objects in the field external to the mobile device using the composite three-dimensional depth map of the field.

11. The method of claim 10, wherein at least one of an object type, an object extent, an object trajectory, or an object geometry of the one or more objects is determined using the composite three-dimensional depth map of the field.

12. The method of claim 10, wherein the one or more objects are tracked within the field external to the mobile device simultaneously using the composite three-dimensional depth map of the field.

13. A mobile device comprising:
a sensor system arranged on the mobile device, the sensor system having a distance sensor rotating during a sequence of scan rotations, the distance sensor capturing distance measurements of a field of view of the mobile device, the distance measurements captured at a unique set of angular scan positions per revolution of the distance sensor over the sequence of scan rotations; and
one or more processors generating a three-dimensional point cloud representation of the field of view based on the distance measurements for each scan rotation in the sequence of scan rotations, the one or more processors generating a composite three-dimensional depth map of the field of view by compiling each of the three-dimensional point cloud representations for the sequence of scan rotations, each of the three-dimensional point cloud representations having a resolution that is lower than a resolution of the composite three-dimensional depth map of the field of view.

14. The mobile device of claim 13, wherein the distance measurements are captured by rotating a column of pixels of the distance sensor over a different sequence of angular scan positions from one scan rotation to another scan rotation in the sequence of scan rotations.

15. The mobile device of claim 14, wherein a number of angular scan positions of the different sequence of angular scan positions for each scan rotation in the sequence of scan rotations is based on an irrational number.

16. The mobile device of claim 14, wherein each point in the three-dimensional point cloud representation for a corresponding scan rotation in the sequence of scan rotations represents a three-dimensional position of at least one surface in the field of view captured by a pixel in the column of pixels when the distance sensor is occupying a discrete angular position at a discrete time during the corresponding scan rotation.

17. The mobile device of claim 16, wherein the composite three-dimensional depth map of the field of view includes a first set of distances between the at least one surface in the field of view represented by adjacent points, the first set of distances being shorter than a second set of distances corresponding to a native spatial resolution of the distance sensor.

18. The mobile device of claim 16, wherein the at least one surface corresponds to one or more objects in the field of view.

19. The mobile device of claim 18, wherein the one or more objects are tracked within the field of view simultaneously using the composite three-dimensional depth map of the field of view.

20. The mobile device of claim 18, wherein at least one of an object type, an object extent, an object trajectory, or an object geometry of the one or more objects is determined using the composite three-dimensional depth map of the field of view.

\* \* \* \* \*